United States Patent
Sastri et al.

[11] Patent Number: 6,001,926
[45] Date of Patent: Dec. 14, 1999

[54] FIBER-REINFORCED PHTHALONITRILE COMPOSITE CURED WITH LOW-REACTIVITY AROMATIC AMINE CURING AGENT

[75] Inventors: Satya B. Sastri, Greenbelt, Md.; Teddy M. Keller, Alexandria, Va.

[73] Assignee: The United States of America as represented by the Secretary of the Navy, Washington, D.C.

[21] Appl. No.: 08/940,043

[22] Filed: Oct. 2, 1997

[51] Int. Cl.⁶ ............................ B32B 27/34; C08G 83/00
[52] U.S. Cl. ...................... 524/607; 523/200; 523/222; 524/612; 427/389.8; 427/385.5; 428/375; 528/208; 528/353; 528/362
[58] Field of Search ..................... 523/200, 222; 528/208, 353, 362; 524/607, 612; 427/389.8, 385.5; 428/375

[56] References Cited

U.S. PATENT DOCUMENTS

| | | | |
|---|---|---|---|
| 4,051,659 | 10/1977 | Blakelock | 523/222 |
| 4,315,095 | 2/1982 | Keller et al. | 524/612 |
| 4,408,035 | 10/1983 | Keller | 528/183 |
| 4,587,325 | 5/1986 | Keller | 528/172 |
| 4,588,615 | 5/1986 | Otty | 427/389.8 |
| 5,003,039 | 3/1991 | Keller | 528/362 |
| 5,003,078 | 3/1991 | Keller | 548/406 |
| 5,004,801 | 4/1991 | Keller et al. | 528/360 |
| 5,132,396 | 7/1992 | Keller | 528/353 |
| 5,159,054 | 10/1992 | Keller | 528/170 |
| 5,202,414 | 4/1993 | Keller | 528/481 |
| 5,237,045 | 8/1993 | Burchill et al. | 528/362 |
| 5,262,514 | 11/1993 | Keller | 528/322 |
| 5,292,854 | 3/1994 | Keller | 528/170 |
| 5,350,828 | 9/1994 | Keller et al. | 528/183 |
| 5,389,441 | 2/1995 | Keller | 428/395 |
| 5,464,926 | 11/1995 | Keller | 528/206 |

OTHER PUBLICATIONS

Keller, T.M. and Price, T.R., "Amine–Cured Bisphenol–Linked Phthalonitrile Resins", J. Macromol. Sci.–Chem., A18(6), pp. 931–937 (1982).

Sastri et al, "Phthalonitrile–Carbon Fiber Composites" Polymer Composites, Dec. 1996, vol. 17, No. 6, pp. 816–822.

Sastri et al "Phthalonitrile–Glass Fabric Composites", Polymer Composites, Feb. 1997, vol. 18, No. 1, pp. 48–54.

*Primary Examiner*—Andrew E. C. Merriam
*Attorney, Agent, or Firm*—Thomas E. McDonnell; Ralph T. Webb

[57] ABSTRACT

A fiber-reinforced phthalonitrile composite is made by impregnating or coating a fibrous material with a phthalonitrile prepolymer mixture containing a phthalonitrile monomer and an aromatic amine curing agent that is thermally stable and nonvolatile at a temperature up to about 375° C., and that contains at least one electron withdrawing substituent effective to reduce the reactivity of the aromatic amine curing agent with the phthalonitrile monomer.

16 Claims, 1 Drawing Sheet

FIBER-REINFORCED PHTHALONITRILE COMPOSITE CURED WITH LOW-REACTIVITY AROMATIC AMINE CURING AGENT

BACKGROUND OF THE INVENTION

1. Field of the Invention

The invention relates to the fabrication of fiber-reinforced phthalonitrile composites and, in particular, to fiber-reinforced phthalonitrile composites made by a method wherein the curing agent is selected to have low reactivity with the phthalonitrile monomer.

2. Description of the Related Art

Phthalonitrile resins made using amine curing agents are described in Keller, T. M. and Price, T. R., "Amine-Cured Bisphenol-Linked Phthalonitrile Resins", J. Macromol. Sci.-Chem., A18(6), pp. 931–937 (1982), U.S. Pat. No. 4,408,035 to Keller, U.S. Pat. No. 5,003,039 to Keller, U.S. Pat. No. 5,003,078 to Keller, U.S. Pat. No. 5,004,801 to Keller, U.S. Pat. No. 5,132,396 to Keller, U.S. Pat. No. 5,139,054 to Keller, U.S. Pat. No. 5,208,318 to Keller, U.S. Pat. No. 5,237,045 to Burchill et al, U.S. Pat. No. 5,292,854 to Keller and U.S. Pat. No. 5,350,828 to Keller et al., the disclosures of which are incorporated herein by reference.

Fiber-reinforced composites are typically made by heating a phthalonitrile monomer to its melt stage, adding a curing agent to the melted monomer to form a prepolymer mixture and then impregnating or coating a fibrous material such as carbon fiber with the melted prepolymer mixture. The fiber-containing prepolymer mixture is then allowed to cure at an elevated temperature to form the fiber-reinforced composite.

In creating fiber-reinforced composites by the method described above, it is necessary that the phthalonitrile prepolymer melt and flow easily to completely adhere to and impregnate or coat the fibrous material. A problem that often arises is that the high temperature necessary for melting the phthalonitrile monomer also speeds the curing reaction, particularly if a fast-reacting amine such as 1,3-bis(3-aminophenoxy)benzene is used as the curing agent. If the curing reaction proceeds too rapidly, the increase in the viscosity of the prepolymer associated with the curing prevents the prepolymer from flowing freely and completely permeating and impregnating or coating the fibrous material, resulting in a defective or resin-poor composite. This problem may be overcome by using less of the amine curing agent (as shown, for example, in Sastri et al, "Phthalonitrile-Carbon Fiber Composites" Polymer Composites, December 1996, Vol. 17, No.6, pp 816–822 and Sastri et al "Phthalonitrile-Glass Fabric Composites", Polymer Composites, February 1997, Vol. 18, No. 1, pp 48–54, the disclosures of which are incorporated herein by reference). However, using too little of the curing agent results in insufficient and incomplete curing of the phthalonitrile resin. With a fast-reacting amine curing agent such as 1,3-bis(3-aminophenoxy)benzene, the processing window between too much curing agent and not enough curing agent may be narrow. A narrow processing window can increase processing costs because greater care must be taken to insure that the right amount of curing agent is used.

Another problem that arises in the fabrication of fiber-reinforced phthalonitrile composites is that the high temperatures used in many modern methods of composite fabrication tend to be above the decomposition or volatilization temperature of many of the amine curing agents that have been traditionally used in the formation of phthalonitrile polymers. Thus, there is a great need for amine curing agents that are thermally and oxidatively stable at very high temperatures (up to about 375° C.).

An alternative method for creating a fiber-reinforced composite by penetrating and impregnating or coating a fibrous material with a phthalonitrile prepolymer is to dissolve the phthalonitrile prepolymer in a solvent and then impregnate or coat a fibrous material with the solvent/prepolymer mixture. However, the solvent method has its own set of problems such as the potential problem of creating undesirable voids in the composite by the action of entrapped volatilized solvent molecules. Moreover, the solvent method involves additional elaborate processing steps and problems relating to removal and disposal of the solvent.

In methods of creating fiber-reinforced composites by prepreg consolidation and filament winding, a long fibrous tow or filament is run through or dipped into a container of a prepolymer melt or prepolymer/solvent mixture so that the tow or filament becomes thoroughly coated with the prepolymer, forming, for example, a prepreg tape or a preform. In these methods of creating fiber-reinforced composites, it is crucial that the prepolymer not cure too quickly before the coating process is complete.

SUMMARY OF THE INVENTION

Accordingly, it is an object of the invention to provide a fiber-reinforced phthalonitrile composite made by impregnating or coating a fibrous material with a phthalonitrile prepolymer in the melt stage and curing the prepolymer wherein the increase in viscosity associated with the curing of the phthalonitrile prepolymer is delayed to allow thorough impregnation and penetration of the fibrous material.

It is a further object of the invention to provide a fiber-reinforced phthalonitrile composite made by a process that includes the use of a curing additive wherein there is a large processing window for the amount of curing additive used.

It is a further object of the invention to provide a fiber-reinforced phthalonitrile composite that is free of voids.

It is a further object of the invention to provide for the fabrication of fiber-reinforced phthalonitrile composites by the method of prepreg consolidation and filament winding whereby the phthalonitrile prepolymer is cured with a low-reactivity amine curing agent so that the prepolymer does not cure too quickly before the coating process is complete.

It is a further object of the invention to provide a fiber-reinforced composite that is thermally and oxidatively stable at temperatures up to about 375° C.

These and other objects are accomplished by providing a fiber-reinforced thermoset composite made by a process comprising the steps of:

(a) heating a phthalonitrile monomer to its melt stage, (b) combining the phthalonitrile monomer in the melt stage with an aromatic amine curing agent to form a prepolymer mixture (c) heating the prepolymer mixture at a temperature greater than the melting temperature of the prepolymer mixture and equal to or less than about 375° C.

(d) impregnating or coating a fibrous material with the prepolymer mixture to form a fiber-containing composition, and (e) continuing to heat the fiber-containing composition at a temperature above the melting point of the prepolymer mixture and at or below about 375° C. for a sufficient time to cure the fiber-containing composition to form a fiber-reinforced composite, wherein the curing is characterized by an increase in viscosity of the fiber-containing composition and by gelation of the fiber-containing composition wherein the aromatic amine curing agent is selected to have the property of being thermally stable and nonvolatile at a temperature up to about 375° C., wherein the aromatic amine curing agent is added to the phthalonitrile monomer in step (b) in an effective amount to completely cure the fiber-containing composition, and wherein the aromatic amine curing agent contains at least one electron withdrawing substituent effective to reduce the reactivity of the aromatic amine curing agent with the phthalonitrile monomer.

DETAILED DESCRIPTION OF THE PREFERRED EMBODIMENT

Figure 1:
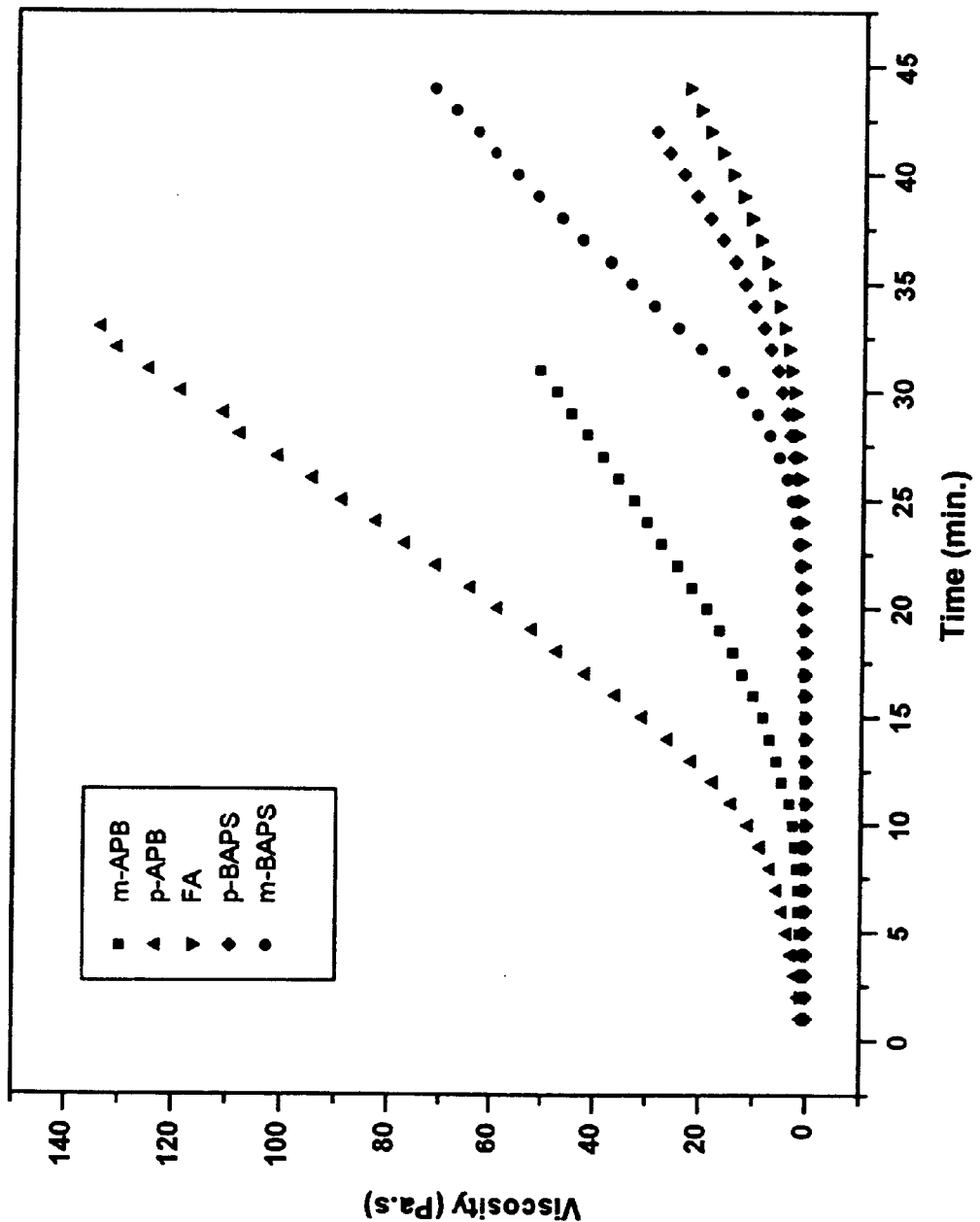
FIG. 1 is a superimposed plot of viscosity vs. time for the curing of 4,4'-bis(3,4-dicyanophenoxy)biphenyl prepolymer at 260° C. with the following aromatic amine curing agents: 1,3-bis(3-aminophenoxy)benzene (m-APB) (comparative example), 1,4-bis(4-aminophenoxy)benzene (p-APB) (comparative example), bis[4-(4-aminophenoxy)phenyl]2, 2'-hexafluoropropane (FA) (included in a second patent application filed herewith by the same inventors), bis[4-(4-aminophenoxy)phenyl]sulfone (p-BAPS) and bis[4-(3-aminophenoxy) phenyl]sulfone (m-BAPS).

The invention relates to a fiber-reinforced thermoset composite made by a process of heating a phthalonitrile monomer to its melt stage, combining the phthalonitrile monomer in the melt stage with an aromatic amine curing agent to form a prepolymer mixture, heating the prepolymer mixture at a temperature greater than the melting temperature of the prepolymer mixture and equal to or less than about 375° C., impregnating or coating a fibrous material with the prepolymer mixture to form a fiber-containing composition, and continuing to heat the fiber-containing composition at a temperature above the melting point of the prepolymer mixture and at or below about 375° C. for a sufficient time to cure the fiber-containing composition to form a fiber-reinforced composite, wherein the curing is characterized by an increase in viscosity of the fiber-containing composition and finally by a gelation of the fiber-containing composition.

The amine curing agent is selected to overcome certain problems specific to the creation of fiber-reinforced composites. In particular, the aromatic amine curing agent is selected to have the property of being thermally stable and nonvolatile at temperatures above the melting point of the phthalonitrile resin and up to about 375° C., so that it does not volatilize or decompose and thereby cause voids in the finished composite. The aromatic amine curing agent is further selected to contain at least one electron withdrawing substituent effective to reduce the reactivity of the aromatic amine curing agent with the phthalonitrile monomer so that the fiber-containing prepolymer mixture does not completely cure until the fibrous material has been completely impregnated or coated. This property of reduced reactivity is especially useful for making thick or multilayer composites.

Preferably, the aromatic amine curing agent is selected from the group consisting of 3,3'-dimethyl-4,4'-diaminodiphenylsulfone,
3,3'-diethoxy-4,4'-diaminodiphenylsulfone,
3,3'-dicarboxy-4,4'-diaminodiphenylsulfone,
3,3'-dihydroxy-4,4'-diaminodiphenylsulfone,
3,3'-disulfo-4,4'-diaminodiphenylsulfone,
3,3'-diaminobenzophenone,
4,4'-diaminobenzophenone,
3,3'-dimethyl-4,4'-diaminobenzophenone,
3,3'-dimethoxy-4,4'-diaminobenzophenone,
3,3'-dicarboxy-4,4'-diaminobenzophenone,
3,3'-dihydroxy-4,4'-diaminobenzophenone,
3,3'-disulfo-4,4'-diaminobenzophenone,
4,4'-diaminodiphenyl ethyl phosphine oxide,
4,4'-diaminodiphenyl phenyl phosphine oxide,
bis[4-(4-aminophenoxy)phenyl]sulfone,
bis[4-(3-aminophenoxy) phenyl]sulfone, and
bis(3-aminophenoxy-4'-phenyl)phenyl phosphine oxide.

Most preferred are aromatic amine curing agents of the formula:

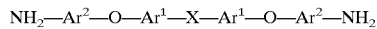

$$NH_2-Ar^2-O-Ar^1-X-Ar^1-O-Ar^2-NH_2$$

where $Ar^1$ and $Ar^2$ are substituted or unsubstituted aromatic groups and X is a electron withdrawing substituent selected from the group consisting of —CO—, —SO$_2$—, —O—PO(R$^1$)—O— and —PO(R$^1$)—, where R$^1$ is an alkyl or aryl group, and aromatic amine curing agents of the formula

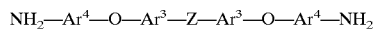

$$NH_2-Ar^4-O-Ar^3-Z-Ar^3-O-Ar^4-NH_2$$

wherein Z is a linking group or a connecting bond and $Ar^3$ and $Ar^4$ are aromatic groups and wherein either $Ar^3$ or $Ar^4$ or both $Ar^3$ and $Ar^4$ are substituted with at least one electron withdrawing substituent selected from the group consisting of $SO_2R^3$, $COOR^4$, $OR^5$, $COR^6$, $SR^7$, $C{\equiv}CR^8$, Ar, and $CH{=}C(R^9)_2$ where $R^3$, $R^4$, $R^5$, $R^6$, $R^7$, $R^8$ and $R^9$ are hydrogen, an alkyl group or an aryl group.

Any polymerizable phthalonitrile monomer may be used as the starting monomer. Examples of suitable phthalonitrile monomers are given in U.S. Pat. No. 3,730,946, U.S. Pat. No. 3,763,210, U.S. Pat. No. 3,787,475, U.S. Pat. No. 3,869,499, U.S. Pat. No. 3,972,902, U.S. Pat. No. 4,209,458, U.S. Pat. No. 4,223,123, U.S. Pat. No. 4,226,801, U.S. Pat. No. 4,234,712, U.S. Pat. No. 4,238,601, U.S. Pat. No. 4,304,896, U.S. Pat. No. 4,315,093, U.S. Pat. No. 4,351,776, U.S. Pat. No. 4,408,035, U.S. Pat. No. 4,409,782, U.S. Pat. No. 5,003,039, U.S. Pat. No. 5,003,078, U.S. Pat. No. 5,159,054, U.S. Pat. No. 5,242,755, U.S. Pat. No. 5,352,760, and U.S. Pat. No. 5,464,926. All of these patents are incorporated herein by reference. For example, the phthalonitrile monomer may be a monomer such as is described in U.S. Pat. No. 5,003,078 and having the formula:

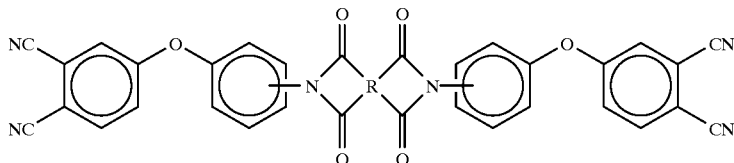

where R is a tetravalent radical or substituted aromatic tetravalent radical of the general formula:

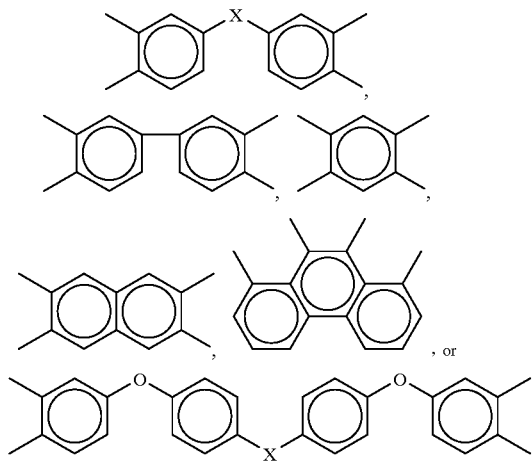

where X is

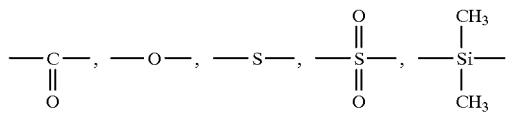

any alkylene of up to six carbon atoms or any halogenated alkylene of up to six carbon atoms. By the word "substituted", it is meant that any known substituent could be attached to the aromatic moiety. Substituents include but are not limited to halogens, chalcogens, and organic radicals such as phenyl, alcohol, carboxyl, carbonyl, or aliphatic groups of less than 10 carbon atoms. The phthalonitrile monomer could also be a monomer such as is described in U.S. Pat. No. 5,464,926 of the formula:

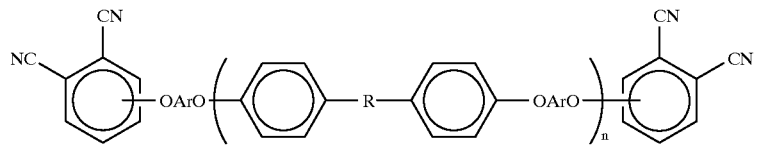

wherein Ar represents an aromatic group, R represents

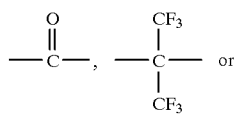

-continued

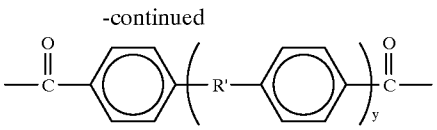

R' represents

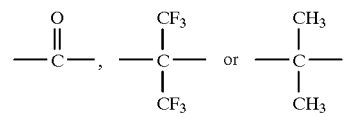

y is an integer having a value of 0 to 4; and
n represents an average value of from 1 to about 100.

Preferably, the phthalonitrile monomer is selected from the group consisting of 4,4'-bis(3,4-dicyanophenoxy) biphenyl, 2,2-bis[4-(3,4-dicyanophenoxy)phenyl] hexafluoropropane, 2,2-bis[4-(3,4-dicyanophenoxy)phenyl] propane and bis[4-(3,4-dicyanophenoxy)phenyl]sulfone, or is a fluorine-containing or non-fluorine-containing oligomeric multiple aromatic ether phthalonitrile monomer prepared from 4,4'-difluorobenzophenone, bisphenol A6F or a non-fluorinated bis-phenol, and 4-nitrophthalonitrile as described in U.S. Pat. No. 5,464,926.

The present invention allows for the use of phthalonitrile monomers having high melting points or high curing temperatures, because the curing reaction at high temperatures is slowed by the use of the less reactive amines, and because the areomatic amine curing agent is selected to be thermally stable and nonvolatile at temperatures up to about 375° C. as described above.

In preparing the fiber-reinforced composite according to the present invention, the phthalonitrile monomer is heated to a temperature above its melting temperature and the aromatic amine curing agent is added to the melt. Some curing begins to take place as soon as the curing agent is added. The mixture can be used immediately to create a fiber-reinforced composite or it can be quenched to form a B-stage prepolymer that can be stored indefinitely at room temperature and used at a later time to create the fiber-reinforced composite.

The use of less reactive aromatic amine curing agents in accordance with the present invention allows a greater ratio of the amine curing agent to the phthalonitrile monomer and allows for a greater processing window before gelation occurs. Preferably, the amine curing agent is added in the amount of 0.1–10 millimole %.

Any fibrous material suitable for forming fiber-reinforced composites can be used in the present invention. Typical fibrous material includes carbon fibers, aramid fibers, glass fibers or ceramic fibers. The fibrous material may be in any form including woven fabrics, nonwoven mats, or tow.

The steps of impregnating or coating the fibrous material to create a fiber-containing composition and of curing the fiber-containing composition to form a fiber-reinforced composite may by carried out by any method known in the art for creating fiber-reinforced composites. In particular, conventional methods of prepreg consolidation, filament winding, resin transfer and resin infusion may be used. For example, Sastri et al "Phthalonitrile-Glass Fabric Composites", Polymer Composites, February 1997, Vol. 18, No. 1, page 51 describes resin infusion as follows: "The resin infusion process has been reported by Ahn and coworkers . . . as an alternative to the conventional lamination process using prepregs. This technique simplifies the composite manufacturing process where impregnation and consolidation are combined in a single step. In this process, unlike with prepregs, each ply is made up of dry fibers while the matrix resin is placed at the top or bottom. A mold is formed by the sealant tape and bagging materials and the matrix resin may be in the form of a film, powder, pellet or viscous liquid. This processing technique is particularly attractive for resins that can exhibit low viscosity values at elevated temperatures." As used herein, the term "impregnating" a fibrous material means saturating the fibrous material with the prepolymer mixture, such as is typically done in the conventional methods of resin transfer and resin infusion or other methods. The term "coating" the fibrous material means covering the fibrous material with the prepolymer mixture such as is typically done in conventional methods of prepreg consolidation and filament winding or other methods.

Having described the invention, the following examples are given to illustrate specific applications of the invention, including the best mode now known to perform the invention. These specific examples are not intended to limit the scope of the invention described in this application.

EXAMPLES

Example 1 (Comparative Example)

4,4'-Bis(3,4-dicyanophenoxy)biphenyl prepolymer synthesis with 1,3-bis(3-aminophenoxy)benzene (m-APB) (Composition 1)

100 g of 4,4'-bis(3,4-dicyanophenoxy)biphenyl monomer was melted in a 500 ml reaction kettle equipped with a mechanical stirrer. The initial temperature was maintained at about 280° C. and subsequent to monomer melting, the temperature was lowered to 255° C. At this time, 2.50 wt. % of 1,3-bis(3-aminophenoxy)benzene (m-APB) (8.55 mmoles) was added to the monomer melt, stirred for 15 minutes and quenched to room temperature. The prepolymer was pulverized to a fine powder and used for cure studies.

Example 2 (Comparative Example)

4,4'-Bis(3,4-dicyanophenoxy)biphenyl prepolymer synthesis with 1,3-bis(3-aminophenoxy)benzene (m-APB) (Composition 2)

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. At this time, 3.97 wt. % of 1,3-bis(3-aminophenoxy)benzene (m-APB) (13.58 mmoles) was added to the monomer melt, stirred for 15 minutes and quenched to room temperature. The prepolymer was pulverized to a fine powder and used for cure studies.

Example 3 (Comparative Example)

4,4'-Bis(3,4-dicyanophenoxy)biphenyl prepolymer synthesis with 1,4-bis(4-aminophenoxy)benzene (p-APB)

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. At this time, 2.50 wt. % of 1,4-bis(4-aminophenoxy)benzene (p-APB) (8.55 mmoles) was added to the monomer melt, stirred for 15 minutes and quenched to room temperature. The prepolymer was pulverized to a fine powder and used for cure studies.

Example 4

4,4'-Bis(3,4-dicyanophenoxy)biphenyl prepolymer synthesis with bis[4-(4-aminophenoxy)phenyl]2,2'-hexafluoropropane (FA)

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. At this time, 4.43 wt. % of bis[4-(4-aminophenoxy)phenyl]2,2'-hexafluoropropane (FA) (8.55 mmoles) was added to the monomer melt, stirred for 15 minutes and quenched to room temperature. The prepolymer was pulverized to a fine powder and used for cure studies.

Example 5

4,4'-Bis(3,4-dicyanophenoxy)biphenyl prepolymer synthesis with bis[4-(4-aminophenoxy)phenyl] sulfone (p-BAPS) (Composition 1')

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. At this time, 2.5 wt. % of bis[4-(4-aminophenoxy)phenyl]sulfone (p-BAPS) (5.79 mmoles) was added to the monomer melt, stirred for 15 minutes and quenched to room temperature. The prepolymer was finely ground to a fine powder and used for cure studies.

Example 6

4,4'-bis(3,4-dicyanophenoxy)biphenyl prepolymer synthesis with bis[4-(4-aminophenoxy)phenyl] sulfone (p-BAPS) (Composition 2')

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 255° C. 3.69 wt. % of bis[4-(4-aminophenoxy)phenyl]sulfone (p-BAPS) (8.55 mmoles) was added to the monomer melt, stirred for 15 minutes and quenched to room temperature. The prepolymer was finely ground to a fine powder and used for cure studies.

Example 7

4,4'-Bis(3,4-dicyanophenoxy)biphenyl prepolymer synthesis with bis[4-(3-aminophenoxy) phenyl] sulfone (m-BAPS)

100 g of 4,4'-bis(3,4-dicyanophenoxy)biphenyl monomer was melted in a 500 ml reaction kettle equipped with a mechanical stirrer. The initial temperature was maintained at about 280° C.; and subsequent to monomer melting, the temperature was lowered to 250° C. At this time, 3.69 wt. % of bis[4-(3-aminophenoxy) phenyl]sulfone (m-BAPS) (8.55 mmoles) was added to the monomer melt, stirred for 15 min. and quenched to room temperature. The prepolymer was pulverized to a fine powder and used for cure studies.

Example 8

2,2-Bis[4-(3,4-dicyanophenoxy)phenyl] hexafluoropropane prepolymer synthesis with bis[4-(4-aminophenoxy) phenyl]sulfone (p-BAPS)

1.5 g of 2,2-bis[4-(3,4-dicyanophenoxy)phenyl] hexafluoropropane monomer was melted in an aluminum planchet on top of a hot plate. To the melt at 250° C. was added 3.0 wt. % of bis[4-(4-aminophenoxy) phenyl]sulfone (p-BAPS) (0.104 mmoles) with stirring followed by quenching to room temperature after 15 minutes. The prepolymer was finely ground to a fine powder and used for cure studies.

Example 9

2,2-Bis[4-(3,4-dicyanophenoxy)phenyl]propane prepolymer synthesis with bis[4-(4-aminophenoxy) phenyl]sulfone (p-BAPS)

1.5 g of 2,2-bis[4-(3,4-dicyanophenoxy)phenyl]propane monomer was melted in an aluminum planchet on top of a hot plate. To the melt at 250° C. was added 2.0 wt. % of bis[4-(4-aminophenoxy)phenyl]sulfone (p-BAPS) (0.069 mmoles) with stirring followed by quenching to room temperature after 15 minutes. The prepolymer was finely ground to a fine powder and used for cure studies.

Example 10

Bis[4-(3,4-dicyanophenoxy)phenyl]sulfone prepolymer synthesis with 4,4'-diaminobenzophenone 1.5 g of bis[4-(3,4-dicyanophenoxy)phenyl]sulfone monomer was melted in an aluminum planchet on top of a hot plate. To the melt at 250° C. was added 2.0 wt. % of 4,4'-diaminobenzophenone (0.150 mmoles) with stirring followed by quenching to room temperature after 15 minutes. The prepolymer was finely ground to a fine powder and used for cure studies.

Example 11

Oligomeric multiple aromatic ether-containing phthalonitrile monomer prepolymer synthesis with bis[4-(4-aminophenoxy)phenyl]sulfone (p-BAPS)

1.5 g of oligomeric multiple aromatic ether-containing phthalonitrile monomer prepared from 4,4'-difluorobenzophenone (12.01 g, 55.1 mmol), 4,4'-dihydroxybiphenyl (20.11 g, 108.1 mmol), and 4-nitrophthalonitrile (19.0 g, 109.8 mmol) was melted in an aluminum planchet on top of a hot plate. To the melt at 250° C. was added 2.0 wt. % of bis[4-(4-aminophenoxy)phenyl]sulfone (p-BAPS) (0.069 mmoles) with stirring followed by quenching to room temperature after 15 minutes. The prepolymer was finely ground to a fine powder and used for cure studies.

Example 12

Phthalonitrile cure characterization by differential scanning calorimetry (DSC) and thermogravimetric analysis (TGA)

DSC studies were performed on mixtures of 4,4'-bis(3,4-dicyanophenoxy)biphenyl monomer and amines (used in Examples 1–7) to monitor the cure reaction exotherm. Typically, 5–8 mg of monomer and 2–5 wt. % amine were weighed in a Perkin Elmer DSC pan, sealed and heated at 10° C./min. With all the monomer/amine mixture samples, i. e. with amines that contain electron donating groups on the aromatic ring (m-APB and p-APB) as well as the ones with electron withdrawing groups (such as in FA, p-BAPS and m-BAPS), the DSC traces showed the amine melting peak (an endotherm), monomer melting peak around 250° C. (an endotherm) and a small exothermic peak between 250 and 260° C. corresponding to the reaction of the amine with the monomer. Thus, it appears that the cure exotherm position is not very sensitive to the presence of either electron donating or electron withdrawing groups on the reacting amines.

Approximately, 1 g of the each prepolymer from Examples 1–7 was placed in an aluminum planchet and subjected to a heat treatment of 16 hours at 250° C. in an air circulating oven. A vitrified product results upon heat treatment in all cases. The thermal stability of the various polymers was ascertained by TGA studies on powdered samples under an inert atmosphere of nitrogen. Results indicate that in all cases, the polymer is stable up to 400° C. and begins to lose weight thereafter. When the powdered samples are postcured to elevated temperatures of 8 hours at 350° C. and 8 hours at 375° C. in the TGA furnace, all samples show improved thermal stability with weight loss occurring only above 500° C. The samples also retain about 65–70% char upon pyrolysis to 1000° C. under inert conditions. In an oxidative environment, samples cured to 250° C. show rapid weight loss above 400° C., typical of most carbon-based materials. Samples that are postcured to elevated temperatures of 8 hours at 350° C. and 8 hours at 375° C. in the TGA furnace show better thermo-oxidative stability than the 250° C. cured samples and are stable up to 500° C. Thus, even in the thermal analyses measurements, the curing additives with electron donating groups (i. e. m-APB and p-APB) and the curing agents with electron withdrawing groups (FA, p-BAPS and m-BAPS) afford polymers with comparable thermal and oxidative stabilities.

Example 13

Cure studies on phthalonitrile prepolymers from Examples 1 and 2 (Comparative Example)

1 g of each prepolymer made with amine contents 2.5% and 3.97% by wt. (composition 1 and composition 2 described in Examples 1 and 2, respectively) was placed in an aluminum planchet and heated on a hot plate at 250° C. The viscosity increased very rapidly in the sample with a higher amine content (3.97 wt. %) and a vitrified product resulted within 25–30 minutes of the reaction time. On the other hand, the sample with 2.5% amine built up viscosity slower and a vitrified product resulted after about 5 hours of reaction time at 250° C. This experiment demonstrates that the processability and curing rate of prepolymers that are cured using an aromatic amine curing agent that has an electron donating group on the aromatic ring is very sensitive to the concentration of the curing agent. In particular, the prepolymer made with 3.97% amine content using m-APB or p-APB as curing agents would cure too quickly to be useful in making a fiber-reinforced composite.

Example 14

Cure studies on phthalonitrile prepolymers from Examples 5 and 6

1 g of each prepolymer made with p-BAPS amine content of 2.5% and 3.69% by wt. (composition 1' and composition 2' described in Examples 5 and 6, respectively) was placed in an aluminum planchet and heated on a hot plate at 250° C. The viscosity increase was faster with the composition 2' relative to the prepolymer with composition 1'. However, contrary to that described in Example 13, both samples required much longer dwells at elevated temperatures for vitrified products to result. For instance, even after 16 hours at 250° C., composition 1' remained a viscous mass whereas composition 2' yielded a vitrified product after about 8 hours at 250° C. These results suggest that the reactivity of p-BAPS amine is lower compared to the m-APB amine and this difference may be attributed to the presence of an electron withdrawing group in the former amine and an electron donating group in the latter case. It may be inferred that the curing of prepolymers cured with aromatic amine curing agents containing electron withdrawing groups may be better controllable than those with electron donating moieties and that the slow-reacting amines, because they maintain a low viscosity for a longer period of time, are more suitable for making fiber-reinforced composites.

Example 15

Rheometric studies on phthalonitrile prepolymers from Examples 1–7

Viscosity studies were conducted using 1.5 g of powdered prepolymer samples and 40 mm parallel plate fixture. For comparative studies, prepolymers made with 8.55 mmoles of amine (i. e. samples from Examples 1, 3, 4, 6 and 7) were used. Data collected at 260° C. (shown in FIG. 1) reveals that aromatic amine curing agents that contain electron donating groups on the aromatic rings (m-APB and p-APB) catalyze the phthalonitrile cure at a faster rate compared to those amines which contain electron withdrawing groups (FA, m-BAPS and p-BAPS). In addition to slowing down the cure, larger quantities of amines with electron withdrawing groups could be used for prepolymer synthesis and the fabrication of fiber-reinforced composites in a more controlled manner. In other words, such amines broaden the processing window for fabricating phthalonitrile-based fiber-reinforced composites.

Obviously, many modifications and variations of the present invention are possible in light of the above teachings. It is therefore to be understood that, within the scope of the appended claims, the invention may be practiced otherwise than as specifically described.

What is claimed is:

1. A method of preparing a fiber-reinforced thermoset composite comprising the steps of:
   (a) heating a phthalonitrile monomer to its melt stage,
   (b) combining the phthalonitrile monomer in the melt stage with an aromatic amine curing agent to form a prepolymer mixture,
   (c) heating the prepolymer mixture at a temperature greater than the melting temperature of the prepolymer mixture,
   (d) impregnating a multilayer fibrous material with the heated prepolymer mixture to form a fiber-containing composition and heating the fiber-containing composition at a temperature above the melting point of the prepolymer mixture for a sufficient time to cure the fiber-containing composition to form a fiber-reinforced composite, the curing being characterized by an increase in viscosity and gelation of the prepolymer mixture in the fiber-containing composition,
   wherein the rate of curing of the fiber-containing composition is controlled by selecting an aromatic amine curing agent having at least one electron withdrawing substituent and having a reactivity with the phthalonitrile monomer that is sufficiently low so that the increase in viscosity and gelation of the prepolymer mixture that occurs when the fiber-containing composition cures is delayed until after the multilayer fibrous material is thoroughly impregnated, and
   wherein the aromatic amine curing agent is selected to have the property of being thermally stable and nonvolatile at a temperature up to about 375° C.

2. The method of claim 1 wherein the multilayer fibrous material is in the form of fiber braids.

3. The method of claim 1 wherein the multilayer fibrous material is carbon fibers.

4. The method of claim 1 wherein the multilayer fibrous material is glass fibers.

5. The method of claim 1 wherein the step (d) of impregnating the multilayer fibrous material with the heated prepolymer mixture is carried out by resin transfer molding.

6. The method of claim 1 wherein the step (d) of impregnating the multilayer fibrous material with the heated prepolymer mixture is carried out by resin infusion molding.

7. The method of claim 1, wherein the aromatic amine curing agent has the general formula

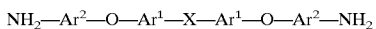

$NH_2-Ar^2-O-Ar^1-X-Ar^1-O-Ar^2-NH_2$ where $Ar^1$ and $Ar^2$ are substituted or unsubstituted aromatic groups and X is the electron withdrawing substituent.

8. The method of claim 7, wherein X is selected from the group consisting of —CO—, —SO$_2$—, —O— PO(R$^1$)—O— and —PO(R$^1$)—, where R$^1$ is an alkyl or aryl group.

9. The method of claim 8, wherein the aromatic amine curing agent has the general formula:

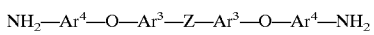

$NH_2-Ar^4-O-Ar^3-Z-Ar^3-O-Ar^4-NH_2$ wherein Z is a linking group or a connecting bond and Ar$^3$ and Ar$^4$ are aromatic groups and wherein either Ar$^3$ or Ar$^4$ or both Ar$^3$ and Ar$^4$ are substituted with at least one electron withdrawing substituent.

10. The method of claim 9 wherein the electron withdrawing substituent is selected from the group consisting of SO$_2$R$^3$, COOR$^4$, OR$^5$, COR$^6$, SR$^7$, C≡CR$^8$, Ar, and CH=C(R$^9$)$_2$ where R$^3$, R$^4$, R$^5$, R$^6$, R$^7$, R$^8$ and R$^9$ are hydrogen, an alkyl group or an aryl group.

11. The method of claim 1, wherein the aromatic amine curing agent is selected from the group consisting of
   3,3'-dimethyl-4,4'-diaminodiphenylsulfone,
   3,3'-diethoxy-4,4'-diaminodiphenylsulfone,
   3,3'-dicarboxy-4,4'-diaminodiphenylsulfone,
   3,3'-dihydroxy-4,4'-diaminodiphenylsulfone,
   3,3'-disulfo-4,4'-diaminodiphenylsulfone,
   3,3'-diaminobenzophenone,
   4,4'-diaminobenzophenone,
   3,3'-dimethyl-4,4'-diaminobenzophenone,
   3,3'-dimethoxy-4,4'-diaminobenzophenone,
   3,3'-dicarboxy-4,4'-diaminobenzophenone,
   3,3'-dihydroxy-4,4'-diaminobenzophenone,
   3,3'-disulfo-4,4'-diaminobenzophenone,
   4,4'-diaminodiphenyl ethyl phosphine oxide,
   4,4'-diaminodiphenyl phenyl phosphine oxide,
   bis[4-(4-aminophenoxy)phenyl]sulfone,
   bis[4-(3-aminophenoxy) phenyl]sulfone, and
   bis(3-aminophenoxy-4'-phenyl)phenyl phosphine oxide.

12. The method of claim 1, wherein the phthalonitrile monomer is a compound of the formula:

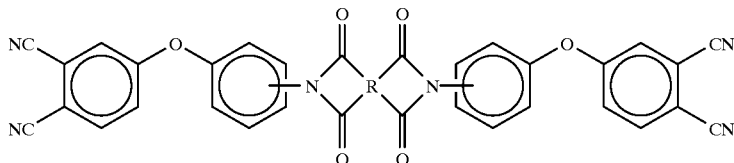

where R is a tetravalent radical or substituted aromatic tetravalent radical of the general formula:

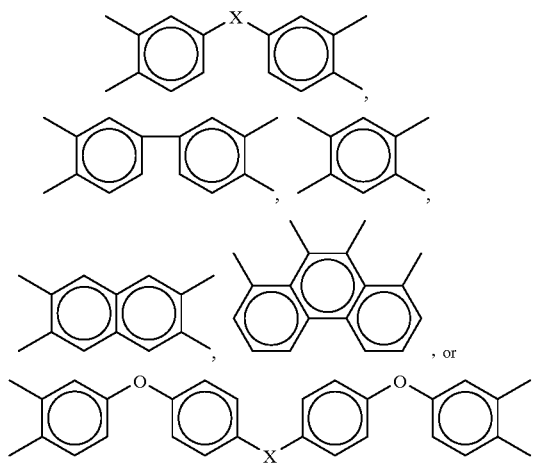

where X is

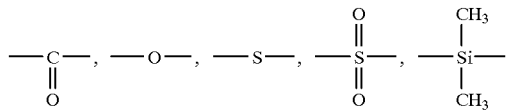

any alkylene of up to six carbon atoms or any halogenated alkylene of up to six carbon atoms.

13. The method of claim 1, wherein the phthalonitrile monomer is a compound of the formula:

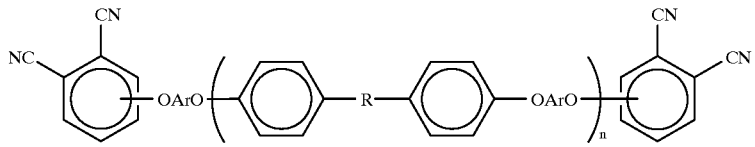

wherein Ar represents an aromatic group, R represents

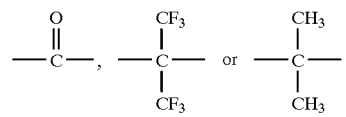

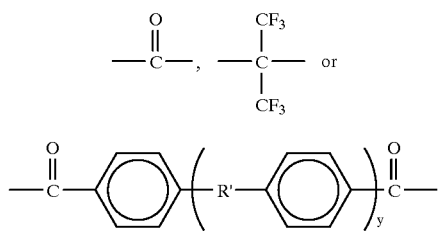

R' represents

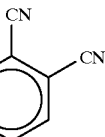

y is an integer having a value of 0 to 4; and
n represents an average value of from 1 to about 100.

14. The method of claim 1 wherein the phthalonitrile monomer is selected from the group comprising 4,4'-bis(3,4-dicyanophenoxy)biphenyl, 2,2-bis[4-(3,4-dicyanophenoxy)phenyl]hexafluoropropane, 2,2-bis[4-(3,4-dicyanophenoxy)phenyl]propane and bis[4-(3,4-dicyanophenoxy)phenyl]sulfone and the aromatic amine curing agent is bis[4-(4-aminophenoxy)phenyl]sulfone.

15. The method of claim 1 wherein the phthalonitrile monomer is selected from the group comprising 4,4'-bis(3,4-dicyanophenoxy)biphenyl, 2,2-bis[4-(3,4-dicyanophenoxy)phenyl]hexafluoropropane, 2,2-bis[4-(3,4-dicyanophenoxy)phenyl]propane and bis[4-(3,4-dicyanophenoxy)phenyl]sulfone and the aromatic amine curing agent is bis[4-(3-aminophenoxy)phenyl]sulfone.

16. A method of preparing a fiber-reinforced thermoset composite comprising the steps of:
(a) heating a phthalonitrile monomer to its melt stage,
(b) combining the phthalonitrile monomer in the melt stage with an aromatic amine curing agent to form a prepolymer mixture,
(c) heating the prepolymer mixture at a temperature greater than the melting temperature of the prepolymer mixture,
(d) coating a fibrous material with the heated prepolymer mixture by a filament winding process to form a fiber-containing composition and heating the fiber-containing composition at a temperature above the melting point of the prepolymer mixture for a sufficient time to cure the fiber-containing composition to form a fiber-reinforced composite, the curing being characterized by an increase in viscosity and gelation of the prepolymer mixture in the fiber-containing composition,
wherein the rate of curing of the fiber-containing composition is controlled by selecting an aromatic amine curing agent having at least one electron withdrawing substituent and having a reactivity with the phthalonitrile monomer that is sufficiently low so that the increase in viscosity and gelation of the prepolymer mixture that occurs when the fiber-containing composition cures is delayed until after the fibrous material is thoroughly impregnated and the filament winding process is complete, and wherein the aromatic amine curing agent is selected to have the property of being thermally stable and non-volatile at a temperature up to about 375° C.

* * * * *